UNITED STATES PATENT OFFICE.

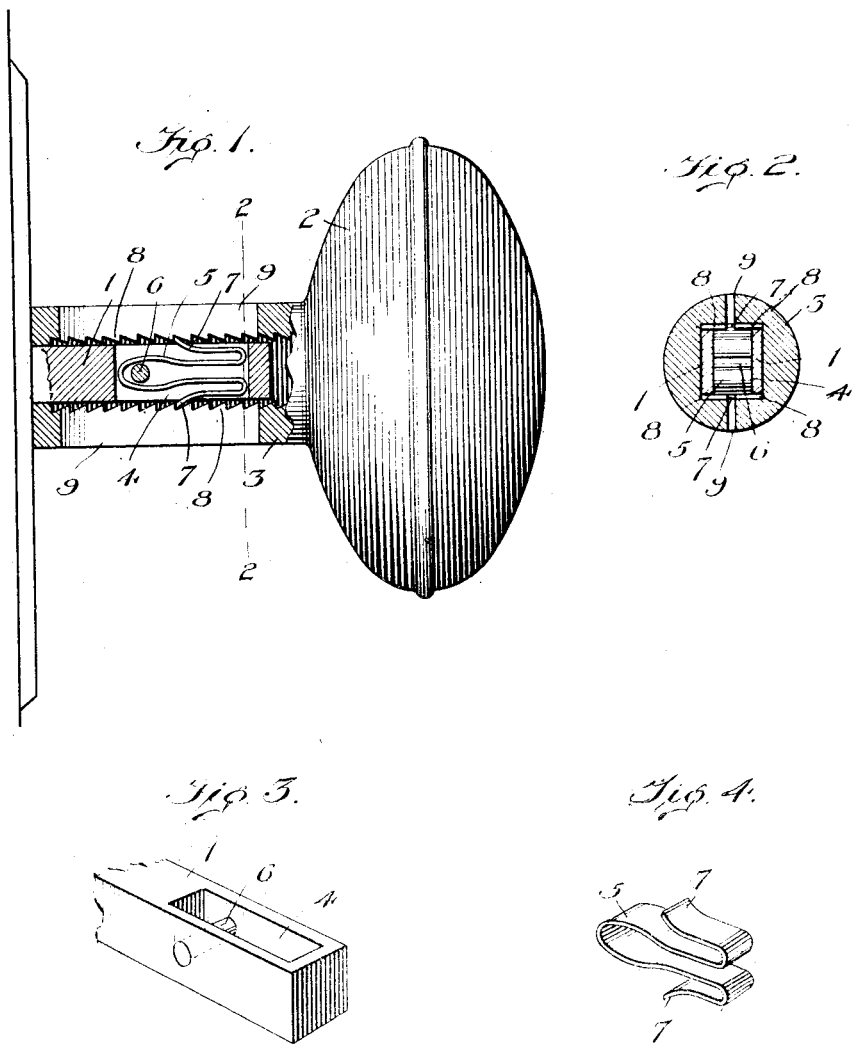

MARTIN McDONALD, OF WASHINGTON, DISTRICT OF COLUMBIA.

DOOR-KNOB FASTENING.

1,128,339.  Specification of Letters Patent.  Patented Feb. 16, 1915.

Application filed November 5, 1914. Serial No. 870,471.

*To all whom it may concern:*

Be it known that I, MARTIN McDONALD, a citizen of the United States, residing at Washington, in the District of Columbia, have invented certain new and useful Improvements in Door-Knob Fastenings, of which the following is a specification.

This invention relates to door knobs, and has for its object to provide improved means for fastening the knob to its spindle, whereby the knob and spindle may be conveniently assembled, and the knob may be adjusted longitudinally of the spindle so as to accommodate the knob to doors of different thicknesses.

A further object of the invention is to have the fastening entirely housed within the shank of the knob, thereby to insure the positive securing of the knob on the spindle.

A still further object of the invention is to provide for access to the fastening means so as to permit of the convenient removal of the knob.

With these and other objects in view, the present invention consists in the combination and arrangement of parts, as will be hereinafter more fully described, shown in the accompanying drawings, and particularly pointed out in the appended claims, it being understood that changes in the form, proportion, size and minor details may be made, within the scope of the claims, without departing from the spirit or sacrificing any of the advantages of the invention.

In the drawings,—Figure 1 is a longitudinal sectional view taken through a door knob and the adjacent end portion of a spindle having my invention applied thereto. Fig. 2 is an enlarged cross-sectional view on the line 2—2 of Fig. 1. Fig. 3 is a perspective view of one end of the spindle. Fig. 4 is a detail perspective view of the double dog or detent which is carried by the spindle.

Like characters of reference designate corresponding parts in each of the figures of the drawing.

As shown in the accompanying drawing, 1 designates a spindle, and 2 a knob of any common or preferred form or construction. The spindle is rectangular in cross-section, as usual, and the tubular shank 3 of the knob is provided with a rectangular bore, as usual, to receive the end portion of the shank.

In carrying out my invention, I provide the shank with an opening 4 extending transversely therethrough and extending longitudinally of the shank for a suitable distance. Within this opening there is mounted a double dog or detent 5, one end of which is pivotally mounted upon a pin 6 carried by the spindle and extending transversely across the opening 4 adjacent the inner end thereof. The dog shown in the accompanying drawing is formed from a single piece of spring metal which is bent intermediate of its ends into substantially U-shape, and the end portion of each side or leg of the dog is bent back upon itself to form a ratchet finger 7, the extremity of which flares outwardly from the U-shaped body or shank of the dog. The dog may be conveniently assembled with the spindle by placing the dog astraddle of the pin 6 and then turning the dog into the opening 4 in longitudinal alinement therewith. The ratchet fingers 7 extend outwardly through the open sides of the slot 4 and slightly beyond the slotted faces of the spindle. Opposite faces of the rectangular bore of the knob shank are provided with ratchet teeth 8, which are engaged by the ratchet fingers 7 when the end of the spindle is received within the shank of the knob, the teeth being disposed so as to hold against the ratchet fingers and prevent removal of the knob.

It will, of course, be understood that each end of the spindle is provided with a dog, and when the spindle has been placed in a door, the knobs may be very conveniently fitted to the respective ends of the spindle and adjusted thereon in accordance with the thickness of the door.

For convenience in removing the knob, the shank is provided with a pair of longitudinal slots 9 in opposite sides thereof and intersecting the toothed faces of the bore of the shank, whereby any suitable instrument may be thrust through the slots 9 so as to press the ratchet fingers away from the ratchet teeth and thus permit convenient withdrawal of the knob from the spindle.

It will be noted that so far as external appearance is concerned, there is little or no change in the knob and spindle, while at the same time the fastening is effectually housed and protected within the shank of the knob. The knob may be very conveniently fitted to the spindle and adjusted lengthwise thereon, and also may be conveniently removed. Looseness of the knob is absolutely prevented by reason of the two ratchet fingers engaging opposite sides of the shank.

Having thus described the invention, what I claim is:—

1. The combination of a spindle and a knob having a shank, the spindle being provided with a longitudinal slot, a double dog mounted in the slot with its extremities projecting at opposite sides of the spindle into engagement with opposite walls of the bore of the knob shank.

2. The combination of a spindle and a door knob having a shank, the spindle being provided with a longitudinal slot, a pin extending across the slot adjacent the inner end thereof, and a double dog formed of a single piece of metal bent into substantially U-shape and having its extremities re-bent and constituting spring fingers, said dog pivotally straddling the pin and lying in the slot, the bore of the knob shank being provided at opposite sides with ratchet teeth for engagement by the extremities of the double dog.

3. The combination of a spindle and a door knob having a shank, the spindle being provided with a longitudinal slot, and a double dog located in the slot and formed of a single piece of metal bent into substantial U-shape and having its extremities re-bent and constituting spring fingers which project through the open sides of the slot into engagement with opposite walls of the bore of the knob shank.

In testimony whereof I affix my signature in presence of two witnesses.

MARTIN McDONALD.

Witnesses:
HERBERT S. SHEPARD,
CLARENCE E. BUSH.